United States Patent
Siminoff et al.

(10) Patent No.: US 10,375,352 B2
(45) Date of Patent: Aug. 6, 2019

(54) LOCATION-WEIGHTED REMUNERATION FOR AUDIO/VIDEO RECORDING AND COMMUNICATION DEVICES

(71) Applicant: Ring Inc., Santa Monica, CA (US)

(72) Inventors: James Siminoff, Pacific Palisades, CA (US); August Cziment, Los Angeles, CA (US)

(73) Assignee: Amazon Technologies, Inc., Seattle, WA (US)

(*) Notice: Subject to any disclaimer, the term of this patent is extended or adjusted under 35 U.S.C. 154(b) by 27 days.

(21) Appl. No.: 15/681,260

(22) Filed: Aug. 18, 2017

(65) Prior Publication Data
US 2018/0063478 A1 Mar. 1, 2018

Related U.S. Application Data

(60) Provisional application No. 62/381,783, filed on Aug. 31, 2016.

(51) Int. Cl.
*H04N 7/18* (2006.01)
*H04N 7/14* (2006.01)
(Continued)

(52) U.S. Cl.
CPC ......... *H04N 7/147* (2013.01); *G06Q 30/0208* (2013.01); *H04L 12/2827* (2013.01);
(Continued)

(58) Field of Classification Search
CPC ........ H04N 7/147; H04N 7/188; H04N 7/186; G06Q 30/0208; H04M 11/025;
(Continued)

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

Ahn, Jeong Hwan, International Search Report and Written Opinion of the International Searching Authority for PCT/US/2017/047676, dated Nov. 29, 2017, International Application Division, Korean Intellectual Property Office, Republic of Korea.

*Primary Examiner* — Shan E Elahi
(74) *Attorney, Agent, or Firm* — Chong IP Law, LLP

(57) ABSTRACT

Location-weighted remuneration for audio/video recording and communication devices in accordance with various embodiments of the present disclosure are provided. In one embodiment, a method for transferring a location-weighted remuneration is provided, the method comprising: assigning an identifier to an owner of a first A/V recording and communication device, receiving a purchase order for a second A/V recording and communication device, wherein the purchase order includes the identifier assigned to the owner of the first A/V recording and communication device, determining a distance between locations of the first and second A/V recording and communication devices, determining an amount of remuneration, wherein the amount of remuneration is inversely proportional to the determined distance between the locations of the first and second A/V recording and communication devices, and transferring the determined amount of remuneration to the owner of the first A/V recording and communication device.

20 Claims, 20 Drawing Sheets

(51) Int. Cl.

| | | |
|---|---|---|
| *H04L 12/28* | (2006.01) | |
| *H04M 1/02* | (2006.01) | |
| *H04M 11/02* | (2006.01) | |
| *G06Q 30/02* | (2012.01) | |
| G08B 3/10 | (2006.01) | |
| G08B 13/196 | (2006.01) | |
| G08B 25/01 | (2006.01) | |
| H04M 1/725 | (2006.01) | |

(52) U.S. Cl.
CPC ....... *H04M 1/0291* (2013.01); *H04M 11/025* (2013.01); *H04N 7/186* (2013.01); *H04N 7/188* (2013.01); *G08B 3/10* (2013.01); *G08B 13/19684* (2013.01); *G08B 13/19695* (2013.01); *G08B 25/016* (2013.01); *H04L 2012/2849* (2013.01); *H04M 1/7253* (2013.01); *H04M 1/72536* (2013.01)

(58) Field of Classification Search
CPC ........... H04M 1/0291; H04M 1/72536; H04M 1/7253; H04L 2012/2849; H04L 12/2827; G08B 3/10; G08B 13/19684; G08B 13/19695; G08B 25/016
USPC ....................................................... 348/143
See application file for complete search history.

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,941,356 | B2 * | 9/2005 | Meyerson ........... H04L 41/0809 370/254 |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,872,915 | B1 | 5/2014 | Scalisi et al. |
| 8,780,201 | B1 | 7/2014 | Scalisi et al. |
| 8,823,795 | B1 | 9/2014 | Scalisi et al. |
| 8,842,180 | B1 | 9/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Scalisi |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Scalisi et al. |
| 9,165,444 | B2 | 10/2015 | Scalisi |
| 9,172,920 | B1 | 10/2015 | Scalisi et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi |
| 9,179,108 | B1 | 11/2015 | Scalisi |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Scalisi |
| 9,619,985 | B2 * | 4/2017 | Stricker ................. G08B 21/02 |
| 9,734,694 | B2 * | 8/2017 | Li ........................ G08B 5/222 |
| 9,736,284 | B2 | 8/2017 | Scalisi et al. |
| 9,736,688 | B2 * | 8/2017 | Li ........................ H04W 12/04 |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 10,038,602 | B2 * | 7/2018 | Chen .................. H04L 41/5077 |
| 2002/0094111 | A1 | 7/2002 | Puchek et al. |
| 2002/0147982 | A1 | 10/2002 | Naidoo et al. |
| 2003/0018805 | A1 * | 1/2003 | Meyerson ........... H04L 41/0809 709/237 |
| 2003/0043047 | A1 | 3/2003 | Braun |
| 2003/0208400 | A1 | 11/2003 | Kuo et al. |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0156361 | A1 | 7/2006 | Wang et al. |
| 2007/0008081 | A1 | 1/2007 | Tylicki et al. |
| 2007/0078706 | A1 * | 4/2007 | Datta .................... G06Q 30/02 705/14.5 |
| 2008/0092199 | A1 * | 4/2008 | McCarthy ............. H04N 7/165 725/133 |
| 2009/0012802 | A1 * | 1/2009 | Pinney ................... G06Q 10/08 705/330 |
| 2010/0095335 | A1 * | 4/2010 | Wilson .................. H04B 3/546 725/105 |
| 2010/0225455 | A1 | 9/2010 | Claiborne et al. |
| 2012/0069131 | A1 * | 3/2012 | Abelow ............... G06Q 10/067 348/14.01 |
| 2012/0146792 | A1 * | 6/2012 | De Luca ............... G08B 21/245 340/568.1 |
| 2012/0190386 | A1 * | 7/2012 | Anderson ............... G01C 15/04 455/456.3 |
| 2013/0018714 | A1 | 1/2013 | George |
| 2013/0057695 | A1 | 3/2013 | Huisking |
| 2014/0267716 | A1 | 9/2014 | Child et al. |
| 2015/0163463 | A1 | 6/2015 | Hwang et al. |
| 2015/0302451 | A1 | 10/2015 | Tietzen et al. |
| 2016/0110745 | A1 | 4/2016 | Iannace et al. |
| 2016/0253710 | A1 * | 9/2016 | Publicover ............... H04W 4/21 705/14.66 |
| 2016/0316363 | A1 * | 10/2016 | Li ........................ H04W 12/04 |
| 2017/0201779 | A1 * | 7/2017 | Publicover ............... H04W 4/21 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |

(56) References Cited

FOREIGN PATENT DOCUMENTS

| | | |
|---|---|---|
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| KR | 10-2013-0089883 A | 8/2013 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

LOCATION-WEIGHTED REMUNERATION FOR AUDIO/VIDEO RECORDING AND COMMUNICATION DEVICES

TECHNICAL FIELD

The present embodiments relate to audio/video (A/V) recording and communication devices, including A/V recording and communication doorbell systems. In particular, the present embodiments improve the effectiveness of A/V recording and communication devices by creating incentives for increasing the density of the distribution of such devices in neighborhoods, thereby making those neighborhoods safer.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present location-weighted remuneration for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that a neighborhood may be made safer by increasing the number of A/V recording and communication devices in that neighborhood. One way to increase the number of A/V recording and communication devices in a neighborhood is by providing an incentive for owners of A/V recording and communication devices to encourage their neighbors to acquire and install such devices. The present embodiments provide this incentive by rewarding owners of A/V recording and communication devices who convince their neighbors to acquire and install such devices, where the value of the reward paid is based on the distance between the owner of the A/V recording and communication device and the neighbor who acquires and installs another A/V recording and communication device. The closer in location the owner and the neighbor are to one another, the greater the value of the reward. The incentives created by the present embodiments are thus designed to increase the density of the distribution of A/V recording and communication devices in neighborhoods, thereby making those neighborhoods safer.

In one non-limiting example embodiment, an owner of a first A/V recording and communication device ("the owner") may be assigned an identifier, such as an alphanumeric code. When the owner encourages his or her neighbors to purchase an A/V recording and communication device, he or she may give the assigned identifier to each such neighbor. When any of those neighbors purchase their own A/V recording and communication device, they may provide, during the purchase process, the identifier that was given to them by the owner. Providing the identifier during the purchase process enables the owner to be credited with the purchase. The owner may then receive a remuneration as a reward for having successfully encouraged his or her neighbor to purchase an A/V recording and communication device. The amount or value of the remuneration may depend upon the distance between the first A/V recording and communication device (the owner's device) and the purchased device, where the owner receives a greater remuneration when the purchased device is located closer to the owner's device. For example, the owner might receive a greater remuneration when the purchased device is located right next door to the owner's device than when the purchased device is located several blocks (or several miles) away from the owner's device.

In a first aspect, a method for transferring a location-weighted remuneration is provided, the method comprising assigning an identifier to an owner of a first A/V recording and communication device comprising a processor, a camera, and a communication module, receiving a purchase order for a second A/V recording and communication device comprising a processor, a camera, and a communication module, wherein the purchase order includes the identifier assigned to the owner of the first A/V recording and communication device, determining a distance between a location of the first A/V recording and communication device and a location of the second A/V recording and communication device, determining an amount of remuneration to be transferred to the owner of the first A/V recording and communication device, wherein the amount of remuneration is inversely proportional to the determined distance between the locations of the first A/V recording and communication device and the second A/V recording and communication device, and transferring the determined amount of remuneration to the owner of the first A/V recording and communication device.

In an embodiment of the first aspect, the location of the first A/V recording and communication device is a known location.

In another embodiment of the first aspect, the known location of the first A/V recording and communication device comprises a street address associated with the first A/V recording and communication device.

In another embodiment of the first aspect, the location of the second A/V recording and communication device is an expected location.

In another embodiment of the first aspect, the expected location of the second A/V recording and communication device comprises a shipping address associated with the purchase order.

In another embodiment of the first aspect, the location of the second A/V recording and communication device is a known location.

In another embodiment of the first aspect, the known location of the second A/V recording and communication device is determined after the second A/V recording and communication device is activated.

In another embodiment of the first aspect, the known location of the second A/V recording and communication device comprises a street address associated with the second A/V recording and communication device.

In another embodiment of the first aspect, the known location of the second A/V recording and communication device comprises a GPS (Global Positioning System) location of the second A/V recording and communication device.

In another embodiment of the first aspect, the known location of the second A/V recording and communication device comprises an IP (Internet Protocol)-based location of the second A/V recording and communication device.

In a second aspect, a method for transferring a location-weighted remuneration is provided, the method comprising assigning an identifier to an owner of a first A/V recording and communication device comprising a processor, a camera, and a communication module, receiving a purchase order for a second A/V recording and communication device comprising a processor, a camera, and a communication module, wherein the purchase order includes the identifier assigned to the owner of the first A/V recording and communication device, determining a location of the first A/V recording and communication device and a location of the second A/V recording and communication device, generating a plurality of non-overlapping zones based upon the distance away from the location of the first A/V recording and communication device, wherein the plurality of zones comprises a first zone that is closer to the location of the first A/V recording and communication device than a second zone that is farther away from the location of the first A/V recording and communication device than the first zone, determining an amount of remuneration to be transferred to the owner of the first A/V recording and communication device, wherein the amount of remuneration is greater when the location of the second A/V recording and communication device is within the first zone and the amount of remuneration is lesser when the location of the second A/V recording and communication device is within the second zone, and transferring the determined amount of remuneration to the owner of the first A/V recording and communication device.

In an embodiment of the second aspect, the location of the first A/V recording and communication device is a known location.

In another embodiment of the second aspect, the known location of the first A/V recording and communication device comprises a street address associated with the first A/V recording and communication device.

In another embodiment of the second aspect, the location of the second A/V recording and communication device is an expected location.

In another embodiment of the second aspect, the expected location of the second A/V recording and communication device comprises a shipping address associated with the purchase order.

In another embodiment of the second aspect, the location of the second A/V recording and communication device is a known location.

In another embodiment of the second aspect, the known location of the second A/V recording and communication device is determined after the second A/V recording and communication device is activated.

In another embodiment of the second aspect, the known location of the second A/V recording and communication device comprises a street address associated with the second A/V recording and communication device.

In another embodiment of the second aspect, the known location of the second A/V recording and communication device comprises a GPS (Global Positioning System) location of the second A/V recording and communication device.

In another embodiment of the second aspect, the known location of the second A/V recording and communication device comprises an IP (Internet Protocol)-based location of the second A/V recording and communication device.

In a third aspect, a location-weighted remuneration server is provided, the server comprising a processor, a communication module, and a memory containing a remuneration application, wherein the remuneration application configures the processor to assign an identifier to an owner of a first A/V recording and communication device comprising a processor, a camera, and a communication module, wherein the first A/V recording and communication device is configured to be in network communication with the remuneration server, receive a purchase order for a second A/V recording and communication device comprising a processor, a camera, and a communication module, wherein the purchase order includes the identifier assigned to the owner of the first A/V recording and communication device, determine a distance between a location of the first A/V recording and communication device and a location of the second A/V recording and communication device, determine an amount of remuneration to be transferred to the owner of the first A/V recording and communication device, wherein the amount of remuneration is inversely proportional to the determined distance between the locations of the first A/V recording and communication device and the second A/V recording and communication device, and transfer the determined amount of remuneration to the owner of the first A/V recording and communication device.

In an embodiment of the third aspect, the location of the first A/V recording and communication device is a known location.

In another embodiment of the third aspect, the known location of the first A/V recording and communication device comprises a street address associated with the first A/V recording and communication device.

In another embodiment of the third aspect, the location of the second A/V recording and communication device is an expected location.

In another embodiment of the third aspect, the expected location of the second A/V recording and communication device comprises a shipping address associated with the purchase order.

In another embodiment of the third aspect, the location of the second A/V recording and communication device is a known location.

In another embodiment of the third aspect, the known location of the second A/V recording and communication device is determined after the second A/V recording and communication device is activated.

In another embodiment of the third aspect, the known location of the second A/V recording and communication device comprises a street address associated with the second A/V recording and communication device.

In another embodiment of the third aspect, the known location of the second A/V recording and communication device comprises a GPS (Global Positioning System) location of the second A/V recording and communication device.

In another embodiment of the third aspect, the known location of the second A/V recording and communication device comprises an IP (Internet Protocol)-based location of the second A/V recording and communication device.

In a fourth aspect, a location-weighted remuneration server is provided, the server comprising a processor, a communication module, and a memory containing a remuneration application, wherein the remuneration application configures the processor to assign an identifier to an owner of a first A/V recording and communication device comprising a processor, a camera, and a communication module, wherein the first A/V recording and communication device is configured to be in network communication with the remuneration server, receive a purchase order for a second A/V recording and communication device comprising a processor, a camera, and a communication module, wherein the purchase order includes the identifier assigned to the owner of the first A/V recording and communication device, determine a location of the first A/V recording and communication device and a location of the second A/V recording and communication device, generate a plurality of non-overlapping zones based upon the distance away from the location of the first A/V recording and communication device, wherein the plurality of zones comprises a first zone that is closer to the location of the first A/V recording and communication device than a second zone that is farther away from the location of the first A/V recording and communication device than the first zone, determine an amount of remuneration to be transferred to the owner of the first A/V recording and communication device, wherein the amount of remuneration is greater when the location of the second A/V recording and communication device is within the first zone and the amount of remuneration is lesser when the location of the second A/V recording and communication device is within the second zone, and transfer the determined amount of remuneration to the owner of the first A/V recording and communication device.

In an embodiment of the fourth aspect, the location of the first A/V recording and communication device is a known location.

In another embodiment of the fourth aspect, the known location of the first A/V recording and communication device comprises a street address associated with the first A/V recording and communication device.

In another embodiment of the fourth aspect, the location of the second A/V recording and communication device is an expected location.

In another embodiment of the fourth aspect, the expected location of the second A/V recording and communication device comprises a shipping address associated with the purchase order.

In another embodiment of the fourth aspect, the location of the second A/V recording and communication device is a known location.

In another embodiment of the fourth aspect, the known location of the second A/V recording and communication device is determined after the second A/V recording and communication device is activated.

In another embodiment of the fourth aspect, the known location of the second A/V recording and communication device comprises a street address associated with the second A/V recording and communication device.

In another embodiment of the fourth aspect, the known location of the second A/V recording and communication device comprises a GPS (Global Positioning System) location of the second A/V recording and communication device.

In another embodiment of the fourth aspect, the known location of the second A/V recording and communication device comprises an IP (Internet Protocol)-based location of the second A/V recording and communication device.

In a fifth aspect, a system for transferring a location-weighted remuneration is provided, the system comprising a first audio/video (A/V) recording and communication device comprising a processor, a camera, and a communication module, wherein the first A/V recording and communication device is configured to be in network communication with a remuneration server, and the remuneration server comprising a processor, a communication module, and a memory containing a remuneration application, wherein the remuneration application configures the processor to assign an identifier to an owner of the first A/V recording and communication device, receive a purchase order for a second A/V recording and communication device comprising a processor, a camera, and a communication module, wherein the purchase order includes the identifier assigned to the owner of the first A/V recording and communication device, determine a distance between a location of the first A/V recording and communication device and a location of the second A/V recording and communication device, determine an amount of remuneration to be transferred to the owner of the first A/V recording and communication device, wherein the amount of remuneration is inversely proportional to the determined distance between the locations of the first A/V recording and communication device and the second A/V recording and communication device, and transfer the determined amount of remuneration to the owner of the first A/V recording and communication device.

In an embodiment of the fifth aspect, the location of the first A/V recording and communication device is a known location.

In another embodiment of the fifth aspect, the known location of the first A/V recording and communication device comprises a street address associated with the first A/V recording and communication device.

In another embodiment of the fifth aspect, the location of the second A/V recording and communication device is an expected location.

In another embodiment of the fifth aspect, the expected location of the second A/V recording and communication device comprises a shipping address associated with the purchase order.

In another embodiment of the fifth aspect, the location of the second A/V recording and communication device is a known location.

In another embodiment of the fifth aspect, the known location of the second A/V recording and communication device is determined after the second A/V recording and communication device is activated.

In another embodiment of the fifth aspect, the known location of the second A/V recording and communication device comprises a street address associated with the second A/V recording and communication device.

In another embodiment of the fifth aspect, the known location of the second A/V recording and communication device comprises a GPS (Global Positioning System) location of the second A/V recording and communication device.

In another embodiment of the fifth aspect, the known location of the second A/V recording and communication device comprises an IP (Internet Protocol)-based location of the second A/V recording and communication device.

In a sixth aspect, a system for transferring a location-weighted remuneration is provided, the system comprising a first audio/video (A/V) recording and communication device comprising a processor, a camera, and a communication module, wherein the first A/V recording and communication device is configured to be in network communication with a remuneration server, and the remuneration server comprising a processor, a communication module, and a memory containing a remuneration application, wherein the remuneration application configures the processor to assign an identifier to an owner of the first A/V recording and communication device, receive a purchase order for a second A/V recording and communication device comprising a processor, a camera, and a communication module, wherein the purchase order includes the identifier assigned to the owner of the first A/V recording and communication device, determine a location of the first A/V recording and communication device and a location of the second A/V recording and communication device, generate a plurality of non-overlapping zones based upon the distance away from the location of the first A/V recording and communication device, wherein the plurality of zones comprises a first zone that is closer to the location of the first A/V recording and communication device than a second zone that is farther away from the location of the first A/V recording and communication device than the first zone, determine an amount of remuneration to be transferred to the owner of the first A/V recording and communication device, wherein the amount of remuneration is greater when the location of the second A/V recording and communication device is within the first zone and the amount of remuneration is lesser when the location of the second A/V recording and communication device is within the second zone, and transfer the determined amount of remuneration to the owner of the first A/V recording and communication device.

In an embodiment of the sixth aspect, the location of the first A/V recording and communication device is a known location.

In another embodiment of the sixth aspect, the known location of the first A/V recording and communication device comprises a street address associated with the first A/V recording and communication device.

In another embodiment of the sixth aspect, the location of the second A/V recording and communication device is an expected location.

In another embodiment of the sixth aspect, the expected location of the second A/V recording and communication device comprises a shipping address associated with the purchase order.

In another embodiment of the sixth aspect, the location of the second A/V recording and communication device is a known location.

In another embodiment of the sixth aspect, the known location of the second A/V recording and communication device is determined after the second A/V recording and communication device is activated.

In another embodiment of the sixth aspect, the known location of the second A/V recording and communication device comprises a street address associated with the second A/V recording and communication device.

In another embodiment of the sixth aspect, the known location of the second A/V recording and communication device comprises a GPS (Global Positioning System) location of the second A/V recording and communication device.

In another embodiment of the sixth aspect, the known location of the second A/V recording and communication device comprises an IP (Internet Protocol)-based location of the second A/V recording and communication device.

BRIEF DESCRIPTION OF THE DRAWINGS

The various embodiments of the present location-weighted remuneration for audio/video (A/V) recording and communication devices now will be discussed in detail with an emphasis on highlighting the advantageous features. These embodiments depict the novel and non-obvious location-weighted remuneration for A/V recording and communication devices shown in the accompanying drawings, which are for illustrative purposes only. These drawings include the following figures, in which like numerals indicate like parts.

DETAILED DESCRIPTION

Figure 1:
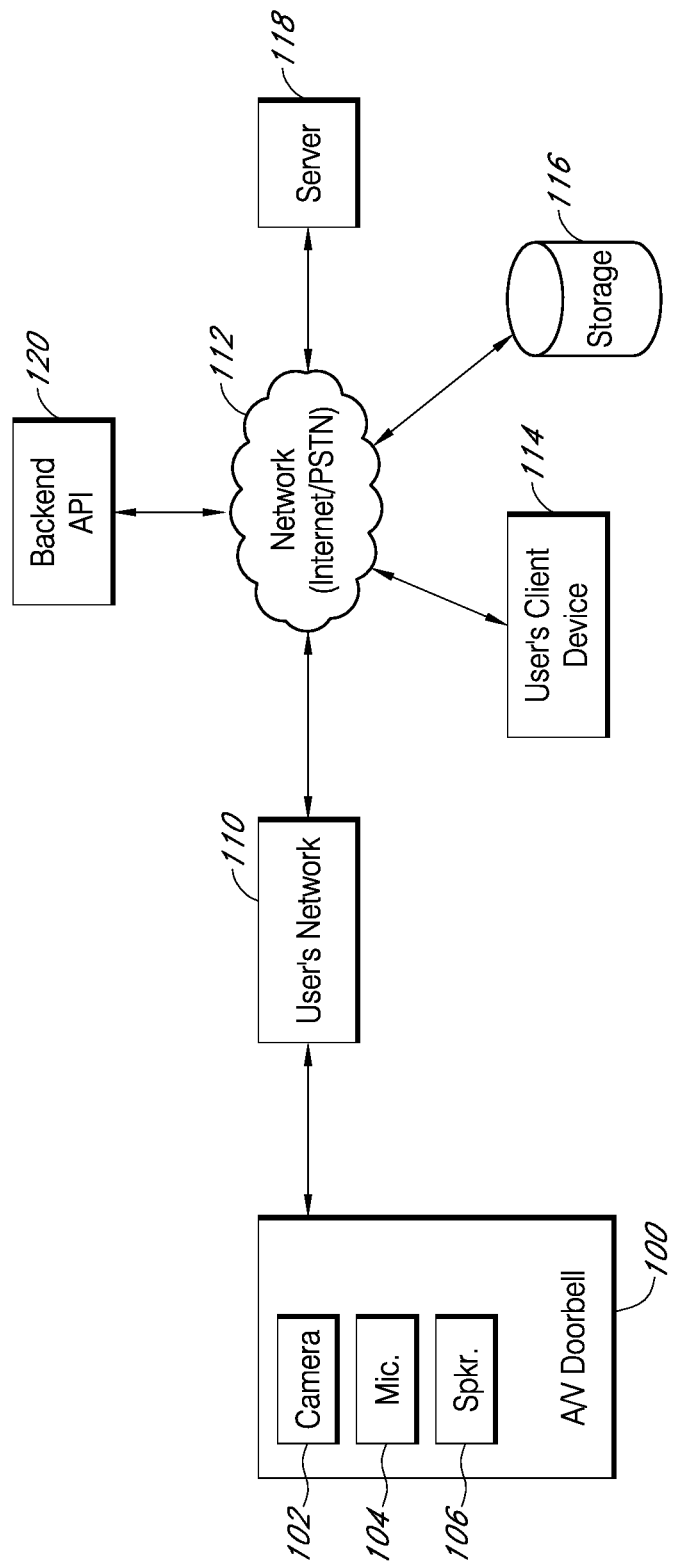
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present location-weighted remuneration for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
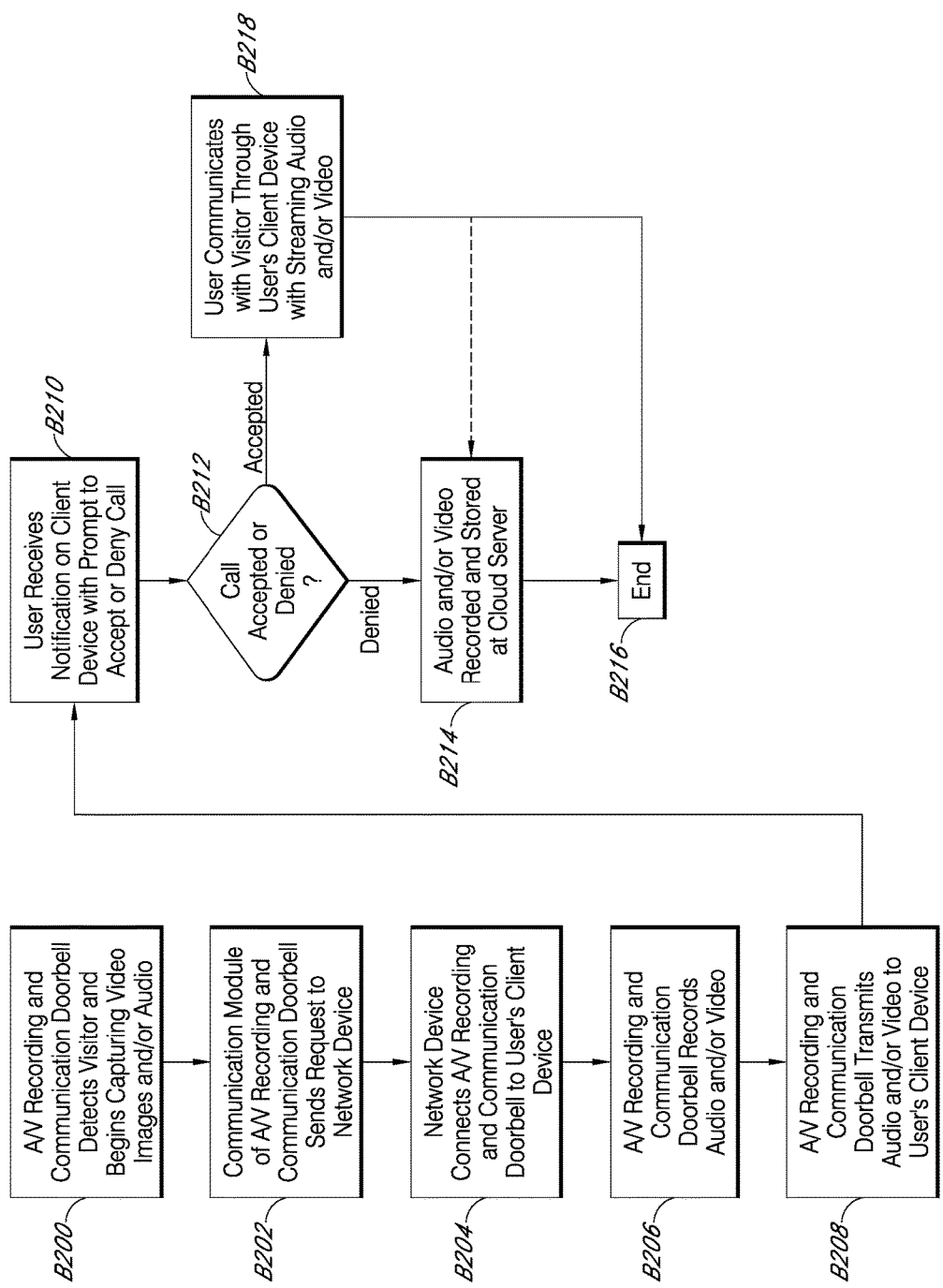
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
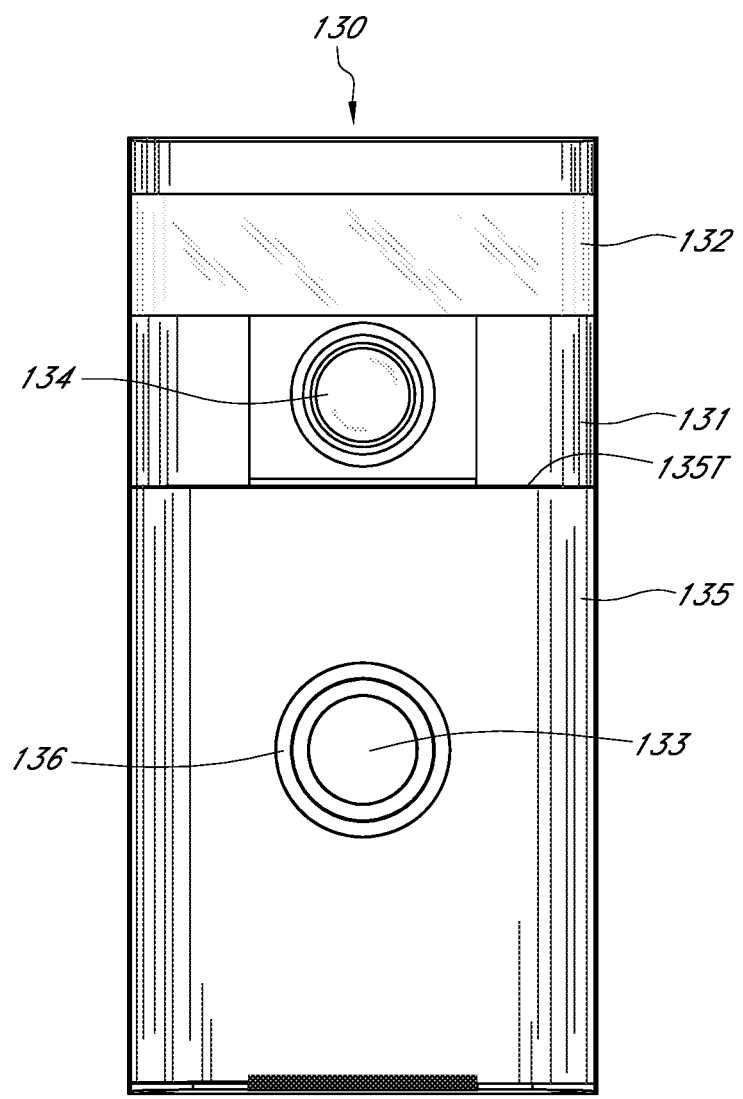
FIG. 3 is a front view of an A/V recording and communication device according to various aspects of the present disclosure.
Figure 4:
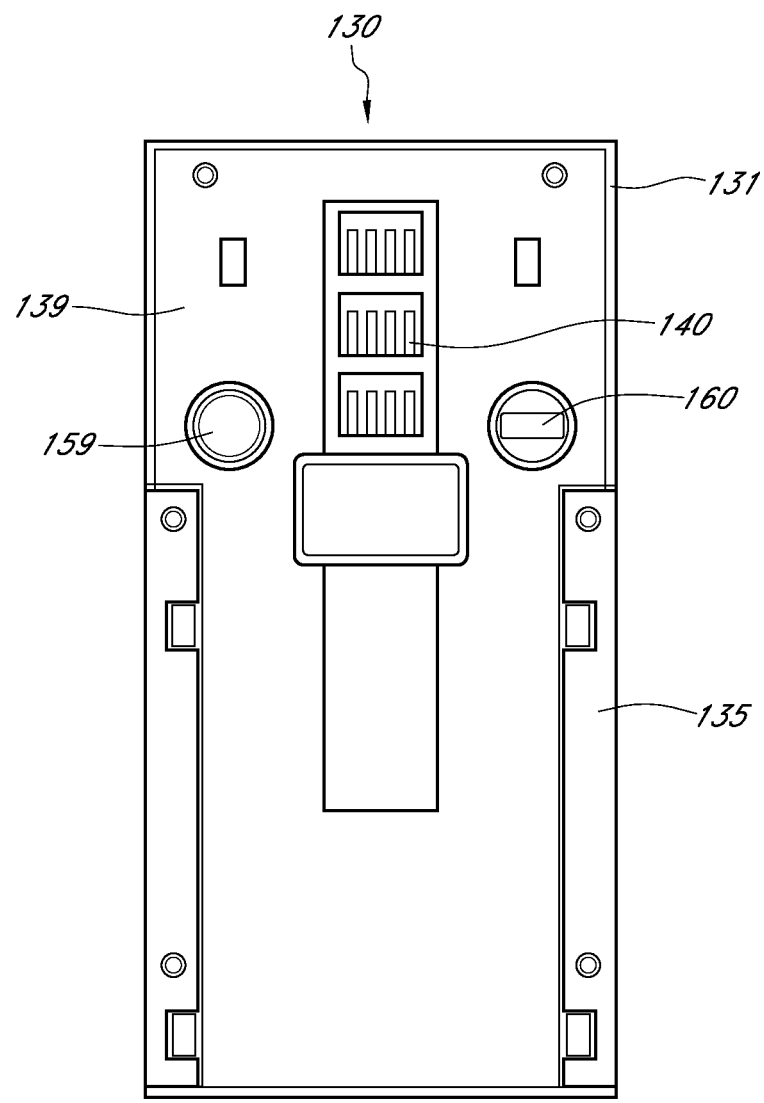
FIG. 4 is a rear view of the A/V recording and communication device of FIG. 3.
Figure 5:
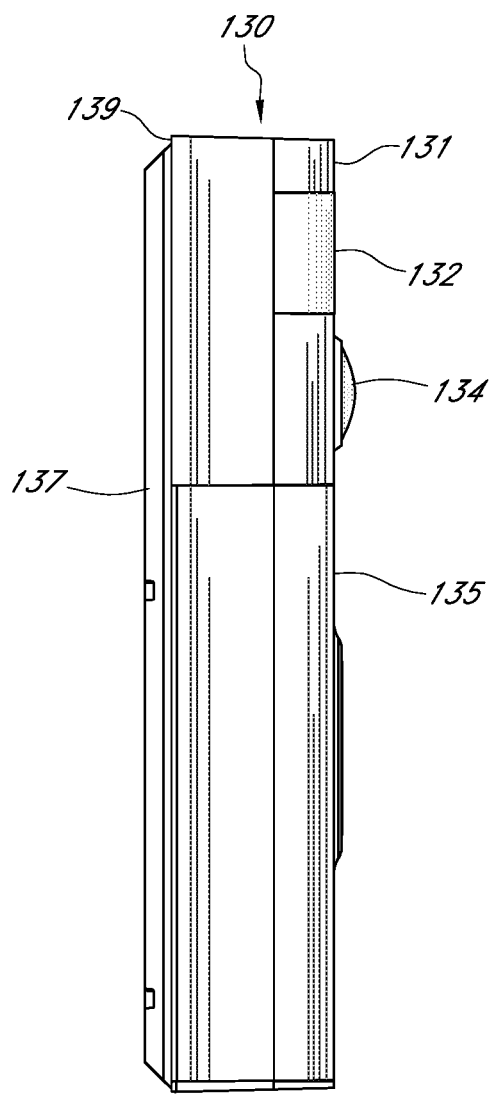
FIG. 5 is a left side view of the A/V recording and communication device of FIG. 3 attached to a mounting bracket according to various aspects of the present disclosure.

FIGS. 3-5 illustrate an audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
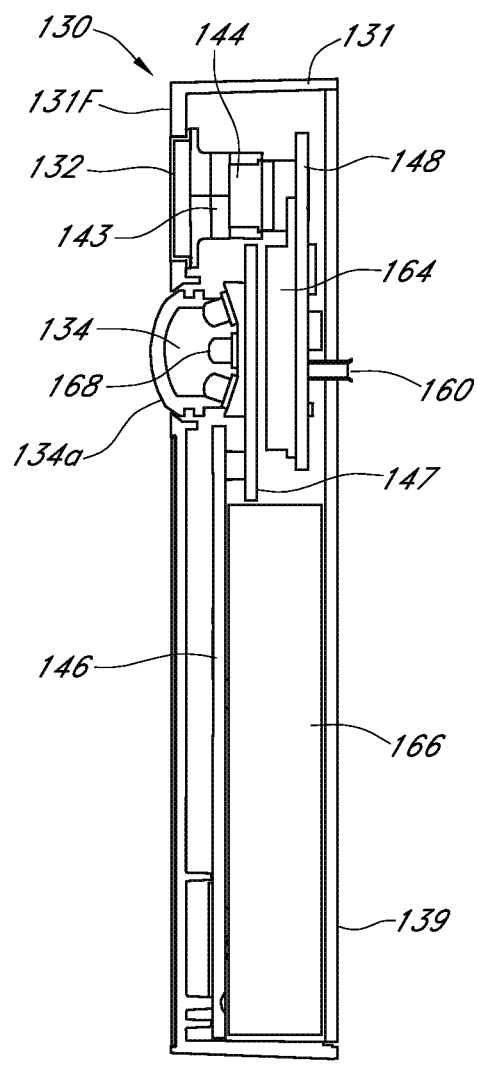
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
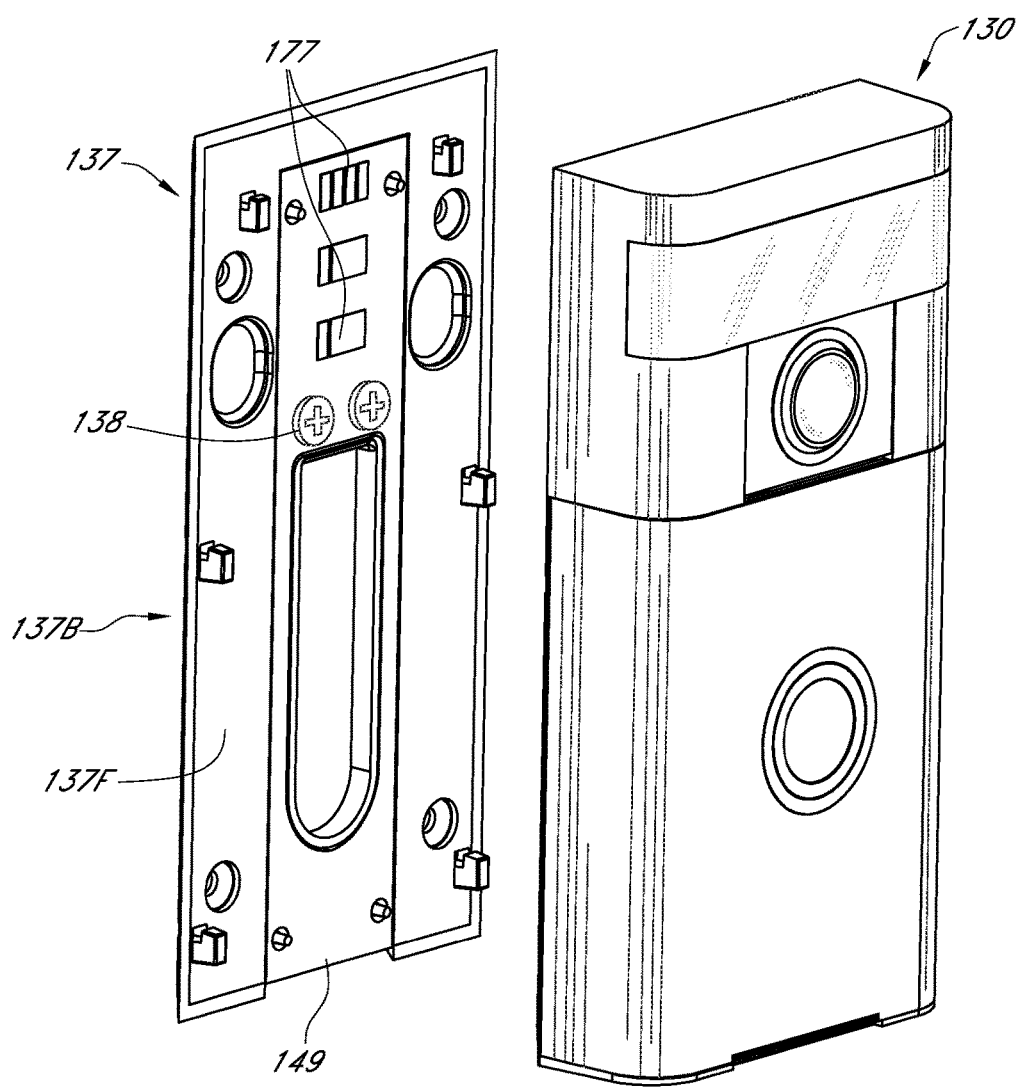
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
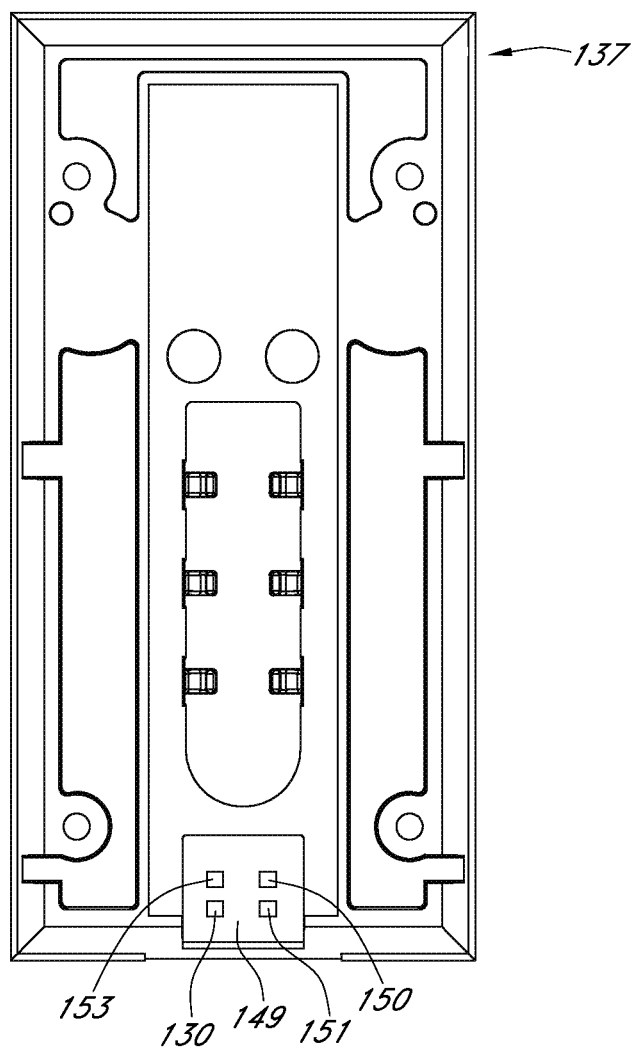
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
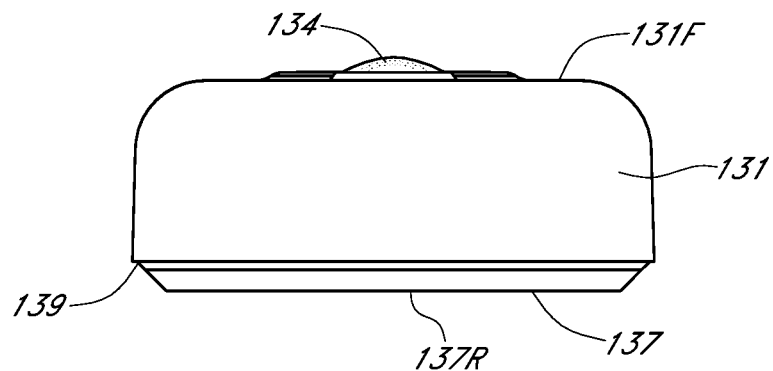
FIGS. 9 and 10 are top and bottom views, respectively, of the A/V recording and communication device and the mounting bracket of FIG. 5.
Figure 10:
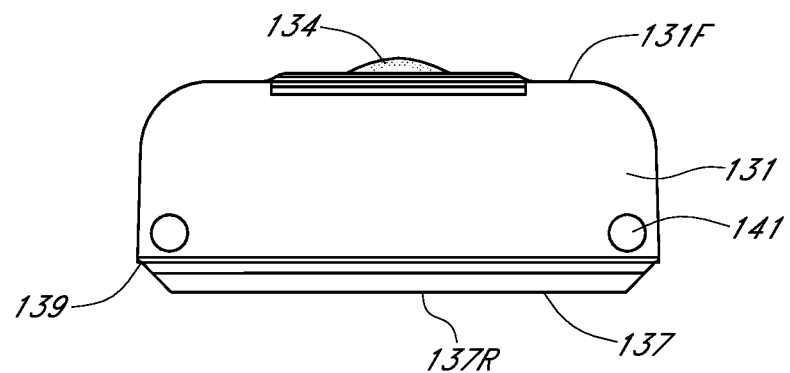

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
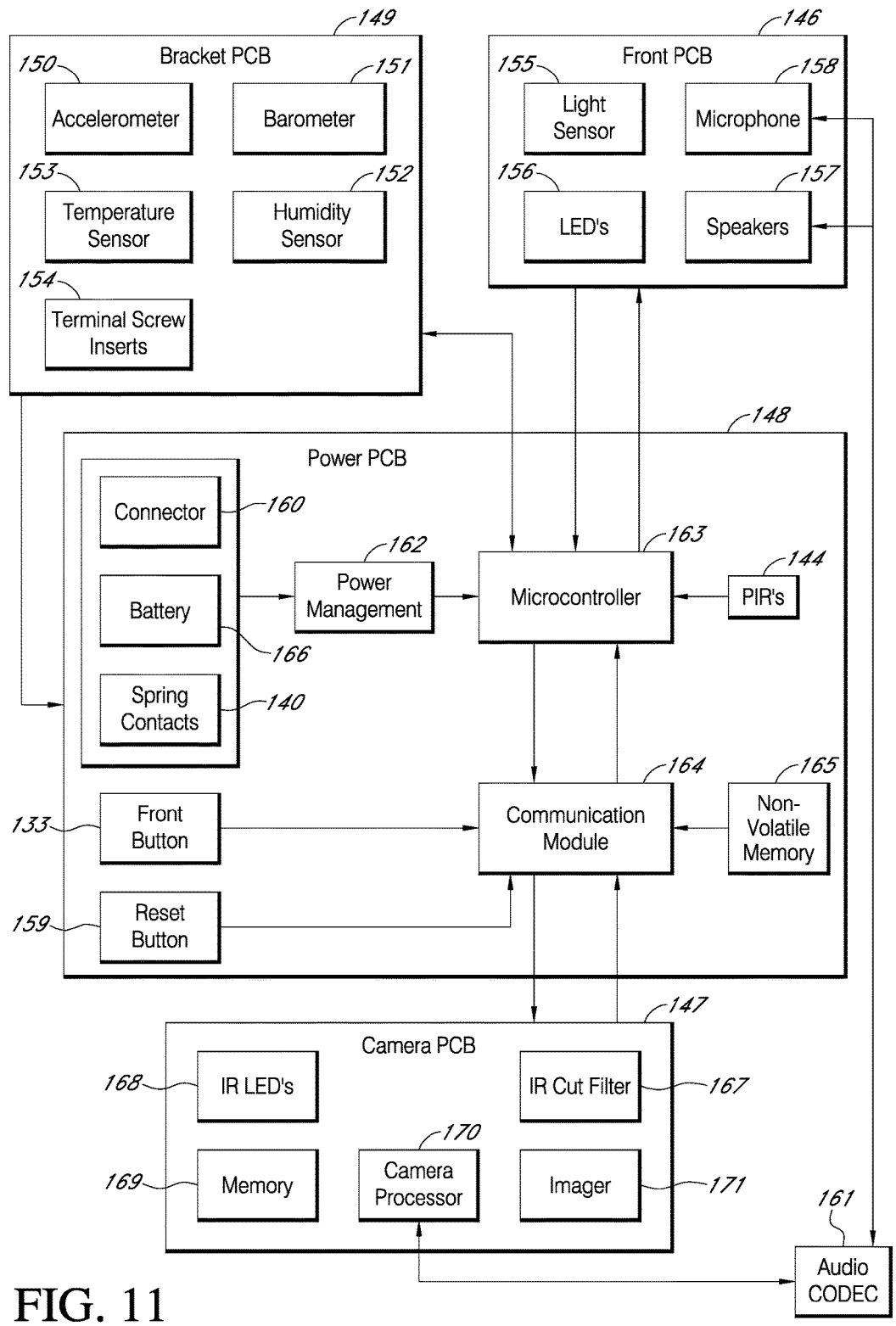
FIG. 11 a functional block diagram of the components of the A/V recording and communication device of FIG. 3.

FIG. 11 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 11, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 11, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 11, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With further reference to FIG. 11, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 11, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 11, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

One aspect of the present embodiments includes the realization that a neighborhood as a whole is safer when more individuals within the neighborhood purchase and install A/V recording and communication devices on their properties, because of the crime deterring effect that such devices provide. However, there may be various reasons why a current user (may also be referred to as "owner") of an A/V recording and communication device may not encourage his or her neighbors to purchase their own A/V recording and communication device(s). For example, a current user may be concerned primarily with the safety of his or her own property (e.g., a home and/or a business) and may have only a mild interest in the increased safety of the entire neighborhood. Further, a current owner of an A/V recording and communication device may not believe that spreading the word about the benefits of A/V recording and communication devices is worth the effort. The various embodiments of the present disclosure solve this problem by creating incentives for current owners of A/V recording and communication devices to encourage their neighbors to purchase such devices by remunerating those owners who succeed at encouraging their neighbors to purchase and activate A/V recording and communication devices. In some embodiments, the remuneration may be in the form of an account credit, or a cash payment, or a voucher for an A/V recording and communication device (or any other device), and/or any other kind or type of remuneration compatible with a specific implementation. Also in some embodiments, the amount or value of the remuneration to the current user may be inversely proportional to the distance between the new purchaser's A/V recording and communication device and the current user's A/V recording and communication device, as further described below. In alternative embodiments, the amount or value of the remuneration to the current user may be based on geographical zones, where the amount of remuneration is greater when the new purchaser's A/V recording and communication device is located in a zone close to the location of the current user's device, as further described below.

In one non-limiting example embodiment, an owner of a first A/V recording and communication device ("the owner") may be assigned an identifier, such as an alphanumeric code. When the owner encourages his or her neighbors to purchase an A/V recording and communication device, he or she may give the assigned identifier to each such neighbor. When any of those neighbors purchase their own A/V recording and communication device, they may provide, during the purchase process, the identifier that was given to them by the owner. Providing the identifier during the purchase process enables the owner to be credited with the purchase. The owner may then receive a remuneration as a reward for having successfully encouraged his or her neighbor to purchase an A/V recording and communication device. The amount or value of the remuneration may depend upon the distance between the first A/V recording and communication device (the owner's device) and the purchased device, where the owner receives a greater remuneration when the purchased device is located closer to the owner's device. For example, the owner might receive a greater remuneration when the purchased device is located right next door to the owner's device than when the purchased device is located several blocks (or several miles) away from the owner's device.

Figure 12:
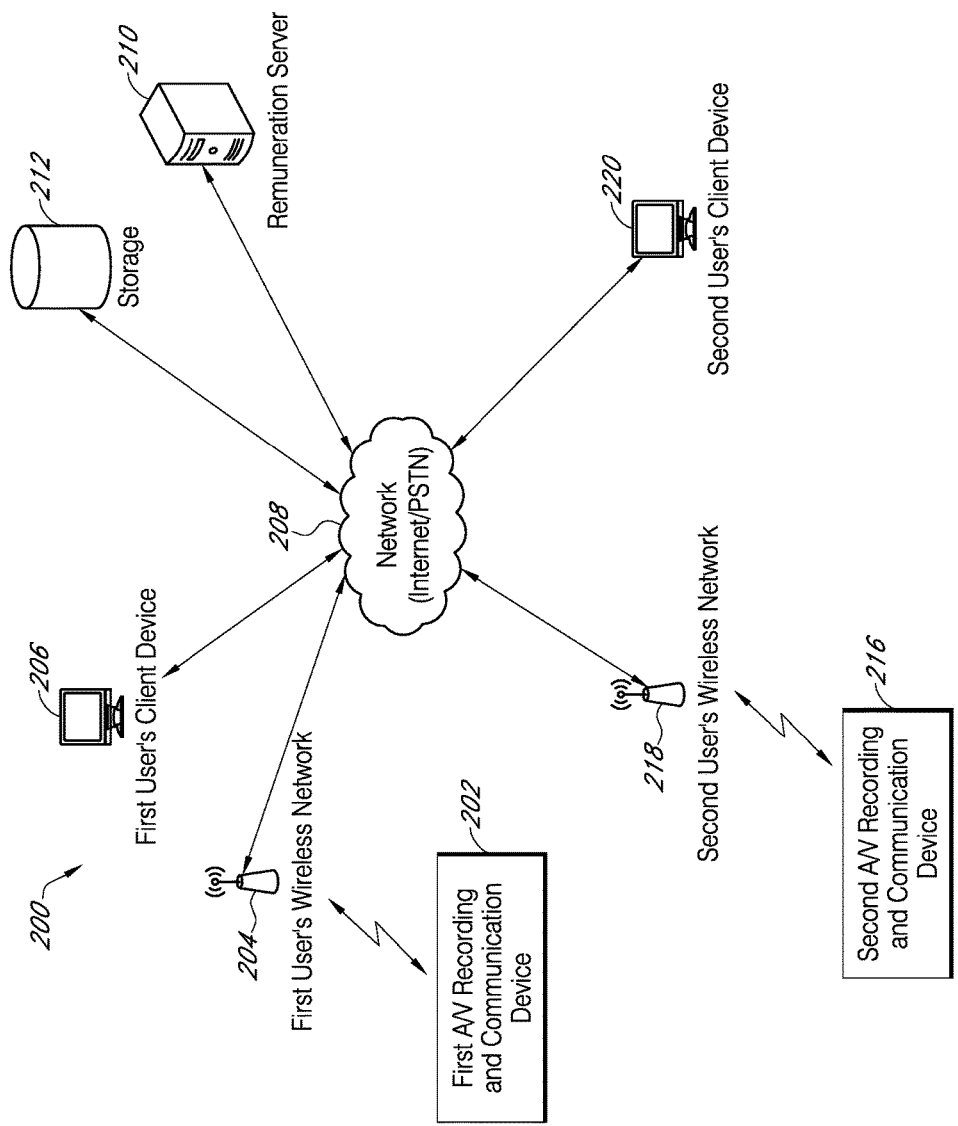
FIG. 12 is a diagram of one embodiment of a system for transferring a location-weighted remuneration according to various aspects of the present disclosure.

FIG. 12 is a diagram of one embodiment of a system for transferring a location-weighted remuneration according to various aspects of the present disclosure. The system 200 may include a first A/V recording and communication device 202 configured to access a first user's network 204 to connect to a network (Internet/PSTN) 208. In some embodiments, the system 200 may also include a second A/V recording and communication device 216 configured to access a second user's network 218 to connect to the network (Internet/PSTN) 208. In some embodiments, the first and second A/V recording and communication devices 202, 216, the first and second user's networks 204, 218, and the network 208 may be similar in structure and/or function to the A/V recording and communication device 130 (FIGS. 2-11), the user's network 110, and the network 112 (FIG. 1), respectively.

The system 200 may include a first user's client device 206 configured to be in network communication with the first A/V recording and communication device 202. The system 200 may also include a second user's client device 220 in network communication with the second A/V recording and communication device 216. In addition, the system 200 may further include a storage device 212 and a remuneration server 210 in network communication with the first A/V recording and communication device 202 and the second A/V recording and communication device 216 for providing a remuneration to an owner of the first A/V recording and communication device 202, as further described below. In some embodiments, the storage device 212 may be a separate device from the remuneration server 210 (as illustrated) or may be an integral component of the remuneration server 210. In some embodiments, the first and second users' client devices 206, 220 and the storage device 212 may be similar in structure and/or function to the user's client device 114 and the storage device 116 (FIG. 1), respectively. Also in some embodiments, the remuneration server 210 may be similar in structure and/or function to the server 118 and/or the backend API 120 (FIG. 1).

With further reference to FIG. 12, the second A/V recording and communication device 216, the second user's network 218, and/or the second user's client device 220 may or may not be present in the system for transferring a location-weighted remuneration, depending on the implementation of the present disclosure, as further discussed below. For example, in some embodiments, the remuneration to be transferred to the owner of the first A/V recording and communication device 202 may be determined using an expected location of the second A/V recording device 216, e.g., prior to the second A/V recording device 216 having been activated. In such embodiments, the second A/V recording and communication device 216, the second user's network 218, and the second user's client device 220 would not be part of the system 200, at least not at the time the remuneration to be transferred to the owner of the first A/V recording and communication device 202 is determined (though these components would become part of the system 200 if and when the second A/V recording and communication device 216 is activated). In alternative embodiments, the remuneration to be transferred to the owner of the first A/V recording and communication device 202 may be determined using a known location of the second A/V recording device 216 following activation of the second A/V recording and communication device 216. In such embodiments, the second A/V recording and communication device 216, the second user's network 218, and the second user's client device 220 would typically be part of the system 200 (as illustrated).

Figure 13:
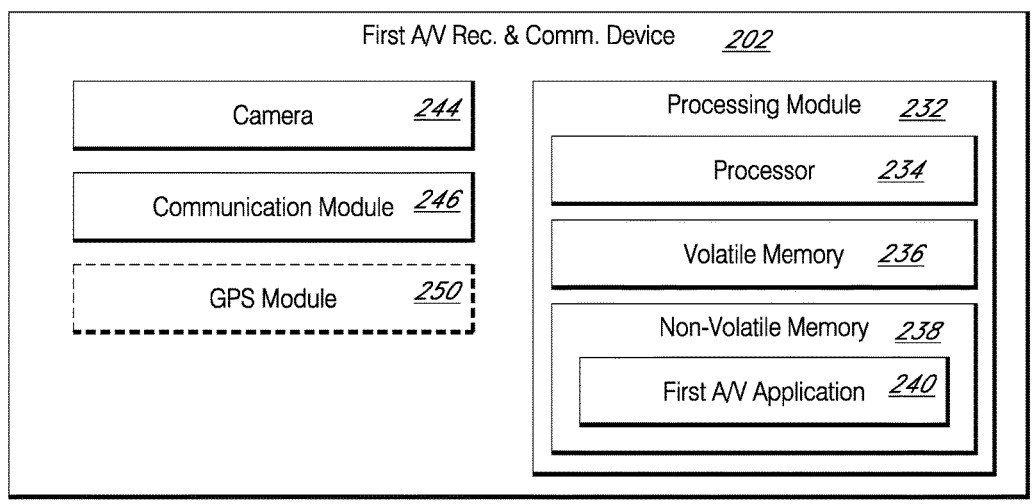
FIG. 13 is a functional block diagram of one embodiment of a first A/V recording and communication device according to an aspect of the present disclosure.

FIG. 13 is a functional block diagram of an embodiment of the first A/V recording and communication device 202 according to an aspect of the present disclosure. The first A/V recording and communication device 202 may include a processing module 232 that is operatively connected to a camera 244 and a communication module 246. The processing module 232 may comprise a processor 234, a volatile memory 236, and a non-volatile memory 238 that includes a first A/V application 240. Further, in some embodiments, the communication module 246 may comprise (but is not limited to) one or more transceivers and/or wireless antennas (not shown) configured to transmit and receive wireless signals.

In some embodiments, the first A/V recording and communication device 202 may also include a GPS (Global Positioning System) module 250 that is operatively connected to the processing module 232. The GPS module 250 may be configured to be part of a global navigation satellite system for providing a location of the first A/V recording and communication device 202 using processes well-known in the art. For example, the GPS module 250 may be configured as a GPS receiver and/or transceiver and used to determine a location of the GPS module 250 using a plurality of GPS satellites orbiting the earth. In such embodiments, the GPS module 250 may use time signals transmitted along a line of sight to the plurality of GPS satellites to determine the location of the GPS module 250 and thus the location of the first A/V recording and communication device 202. Further, in such embodiments, the GPS module 250 may determine the location of the first A/V recording and communication device 202 in conjunction with, or independently of, any telephonic or Internet reception.

In the illustrated embodiment of FIG. 13, the various components including (but not limited to) the processing module 232, the communication module 246, and the GPS module 250 are represented by separate boxes. The graphical representation depicted in FIG. 13 is, however, merely one example, and is not intended to indicate that any of the various components of the first A/V recording and communication device 202 are necessarily physically separate from one another, although in some embodiments they might be. In other embodiments, however, the structure and/or functionality of any or all of these components may be combined. For example, either or both of the communication module 246 and/or the GPS module 250 may include its own processor, volatile memory, and/or non-volatile memory.

Figure 14:
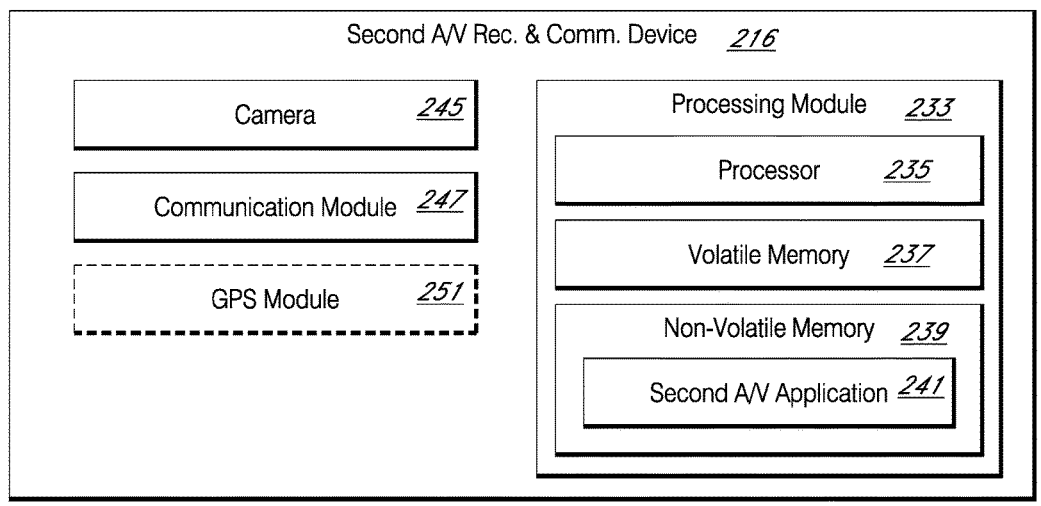
FIG. 14 is a functional block diagram of one embodiment of a second A/V recording and communication device according to an aspect of the present disclosure.

FIG. 14 is a functional block diagram of an embodiment of the second A/V recording and communication device 216 according to an aspect of the present disclosure. The second A/V recording and communication device 216 may include a processing module 233 that is operatively connected to a camera 245 and a communication module 247. The processing module 233 may comprise a processor 235, a volatile memory 237, and a non-volatile memory 239 that includes a second A/V application 241. Further, in some embodiments, the communication module 247 may comprise (but is not limited to) one or more transceivers and/or wireless antennas (not shown) configured to transmit and receive wireless signals.

In further reference to FIG. 14, in some embodiments, the second A/V recording and communication device 216 may also include a GPS module 251 that is operatively connected to the processing module 233. The GPS module 251 may be configured to be part of a global navigation satellite system for providing a location of the second A/V recording and communication device 216 using processes well-known in the art. For example, the GPS module 251 may be configured as a GPS receiver and/or transceiver and used to determine a location of the GPS module 251 using a plurality of GPS satellites orbiting the earth. In such embodiments, the GPS module 251 may use time signals transmitted along a line of sight to the plurality of GPS satellites to determine the location of the GPS module 251 and thus the location of the second A/V recording and communication device 216. Further, in such embodiments, the GPS module 251 may determine the location of the second A/V recording and communication device 216 in conjunction with, or independently of, any telephonic or Internet reception.

In the illustrated embodiment of FIG. 14, the various components including (but not limited to) the processing module 233, the communication module 247, and GPS module 251 are represented by separate boxes. The graphical representation depicted in FIG. 14 is, however, merely one example, and is not intended to indicate that any of the various components of the second A/V recording and communication device 216 are necessarily physically separate from one another, although in some embodiments they might be. In other embodiments, however, the structure and/or functionality of any or all of these components may be combined. For example, either or both of the communication module 247 and/or the GPS module 251 may include its own processor, volatile memory, and/or non-volatile memory.

Figure 15:
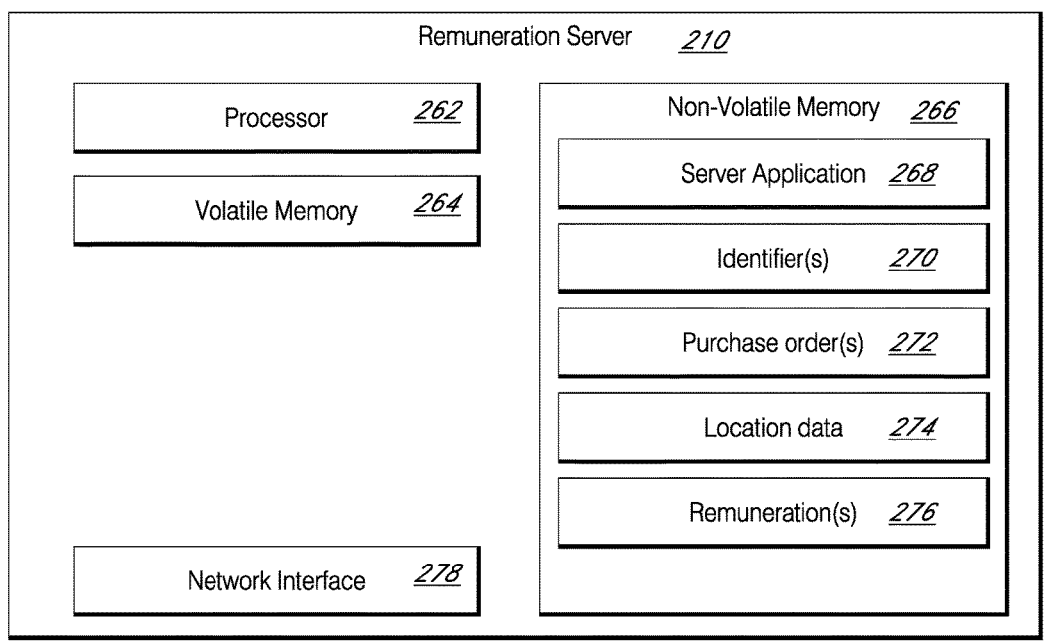
FIG. 15 is a functional block diagram of one embodiment of a remuneration server according to an aspect of the present disclosure.

FIG. 15 is a functional block diagram of an embodiment of the remuneration server 210 according to an aspect of the present disclosure. The remuneration server 210 may include a processor 262, a volatile memory 264, and a non-volatile memory 266 that includes a server application 268. The server application 268 may be used to configure the processor 262 to perform various functions, including (but not limited to) assigning an identifier 270 to an owner of the first A/V recording and communication device 202, receiving a purchase order 272 for the second A/V recording and communication device 216, determining a distance using location data 274 of the first and second A/V recording and communication devices 202, 216, determining an amount of remuneration 276, and transferring the determined amount of remuneration 276 to the owner of the first A/V recording and communication device 202, as further discussed below. In some embodiments, the server application 268 may further configure the processor to generate a plurality of non-overlapping zones based upon the distance between the location of the first A/V recording and communication device 202 and the second A/V recording and communication device 216, as further discussed below. In addition, the remuneration server 210 may also include a network interface 278 for communicating over the network 208 (Internet/PSTN).

Figure 16:
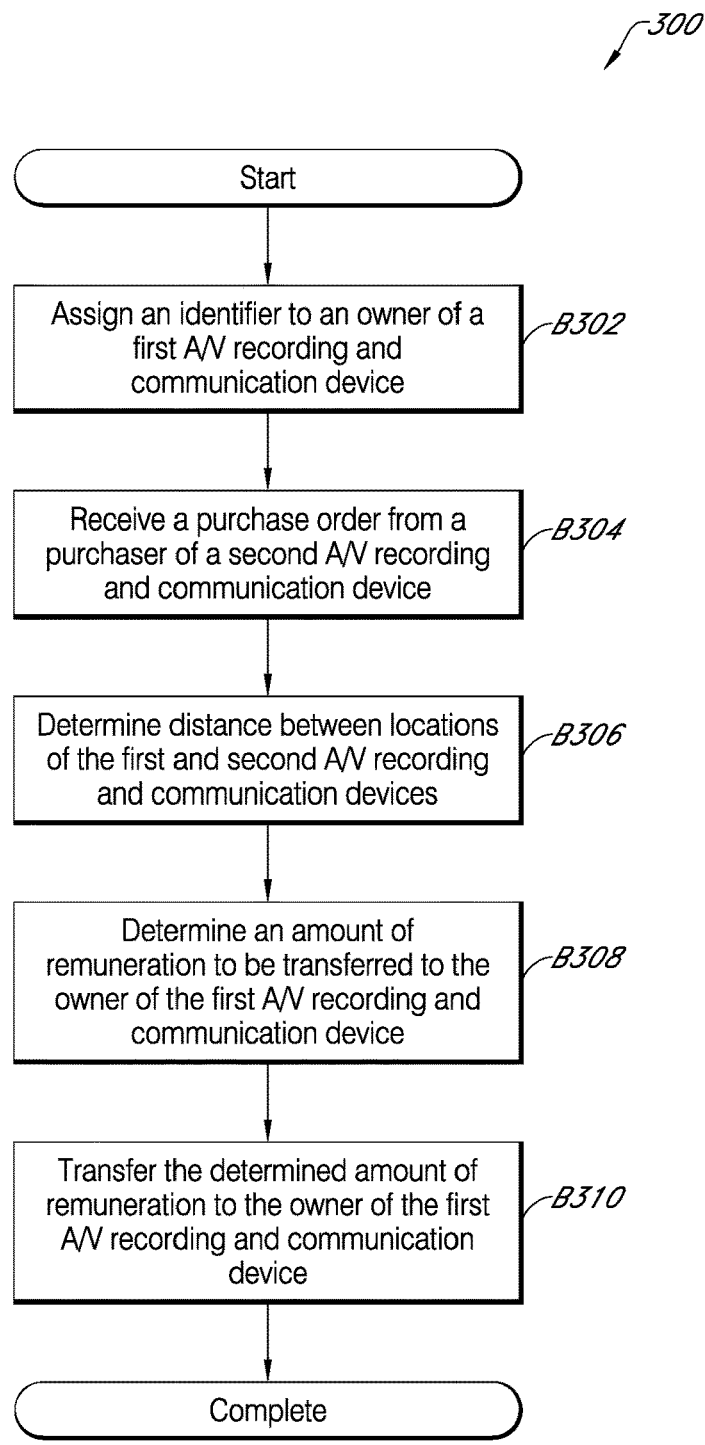
FIG. 16 is a flowchart illustrating one embodiment of a process for transferring a location-weighted remuneration using a distance according to an aspect of the present disclosure.

FIG. 16 is a flowchart illustrating one embodiment of a process 300 for transferring a location-weighted remuneration 276 using a distance between devices according to an aspect of the present disclosure. The process 300 may include assigning (block B302) an identifier 270 to an owner of a first A/V recording and communication device 202 comprising a processor 234, a camera 244, and a communication module 246. The identifier 270 may comprise a variety of identifier types such as (but not limited to) a numeric code, an alphanumeric code, and/or a string of random or non-random characters. In some embodiments, the identifier 270 may be any information associated with the owner of the first A/V recording and communication device 202 including (but not limited to) the owner's name, address, email address, phone number, and/or account number. In some embodiments, the owner of the first A/V recording and communication device 202 may be provided with their assigned identifier 270 to provide to potential purchasers of an A/V recording and communication device. The process 300 may further include receiving (block B304) a purchase order 272 for a second A/V recording and communication device 216 comprising a processor 235, a camera 245, and a communication module 247, wherein the purchase order 272 includes the identifier 270 that has been assigned to the owner of the first A/V recording and communication device 202. In various embodiments, the purchase order 272 may be received from a purchaser such as (but not limited to) an end user, retailer, or 3$^{rd}$ party reseller. In some embodiments, the purchase order 272 may be submitted electronically via the Internet using a web interface or email, for example. In other embodiments, the purchase order 272 may be submitted as a physical hardcopy purchase order. Along with the identifier 270 assigned to the owner of the first A/V recording and communication device 202, the purchase order 272 may also include a shipping address, a billing address, and/or a street address associated with the second A/V recording and communication device 216 and/or associated with the purchaser of the second A/V recording and communication device 216.

As illustrated in FIG. 16, the process 300 may further include determining (block B306) a distance between a location of the first A/V recording and communication device 202 and a location of the second A/V recording and communication device 216. In some embodiments, the location of the first A/V recording and communication device 202 is a known location. For example, the known location of the first A/V recording and communication device 202 may be established when the first A/V recording and communication device 202 is activated. In such embodiments, the known location may comprise a street address, a GPS (Global Positioning System) location, and/or an IP (Internet Protocol)-based location associated with the first A/V recording and communication device 202. In addition, the location of the second A/V recording and communication device 216 may be an expected location such as (but not limited to) a shipping address and/or a billing address associated with the purchase order 272 for the second A/V recording and communication device 216. In alternative embodiments, the location of the second A/V recording and communication device 216 may be a known location, where the known location of the second A/V recording and communication device 216 may be determined after the second A/V recording and communication device 216 is activated. For example, upon activation, the known location of the second A/V recording and communication device 216 may comprise a street address, a GPS location, and/or an IP-based location associated with the second A/V recording and communication device 216. In embodiments where the GPS location is used, the first and/or second A/V recording and communication devices 202, 216 may include a GPS module 250, 251, as described above.

In further reference to FIG. 16, the process 300 may include determining (block B308) an amount of remuneration 276 to be transferred to the owner of the first A/V recording and communication device 202. In various embodiments, the amount of the remuneration 276 may be inversely proportional to the determined distance between the locations of the first and second A/V recording and communication devices 202, 216. In such embodiments, the amount of remuneration 276 may be larger when the first and second A/V recording and communication devices 202, 216 are closer to one another. Likewise, the amount of remuneration 276 may be smaller when the first and second A/V recording and communication devices 202, 216 are farther away from one another. In addition, the process 300 may include transferring (block B310) the determined amount of remuneration 276 to the owner of the first A/V recording and communication device 202.

Figure 17:
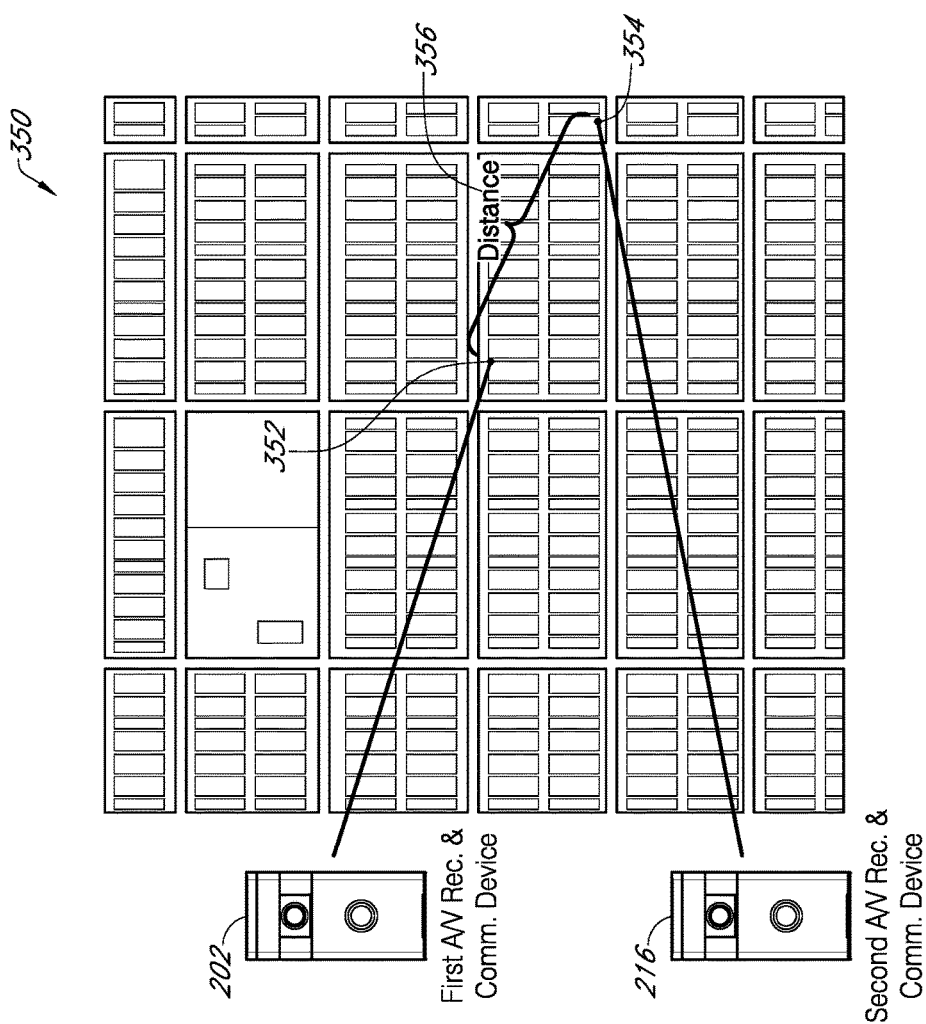
FIG. 17 is a screenshot of a map illustrating a distance between a location of a first A/V recording and communication device and a location of a second A/V recording and communication device according to an aspect of the present disclosure.

FIG. 17 is a screenshot of a map 350 illustrating determining a distance between a location of the first A/V recording and communication device 202 and a location of the second A/V recording and communication device 216 according to an aspect of the present disclosure. The map 350 indicates a location 352 of the first A/V recording and communication device 202. In some embodiments, the location 352 of the first A/V recording and communication device 202 may be a known location as, described above. The map 350 also indicates a location 354 of the second A/V recording and communication device 216. In some embodiments, the location 354 of the second A/V recording and communication device 216 may be a known location or an expected location, as described above. Further, the map 350 also indicates a distance 356 between the location 352 of the first A/V recording and communication device 202 and the location 354 of the second A/V recording and communication device 216, where the distance may be used to determine an amount of remuneration 276 to be transferred to the owner of the first A/V recording and communication device 202, as described above.

Figure 18:
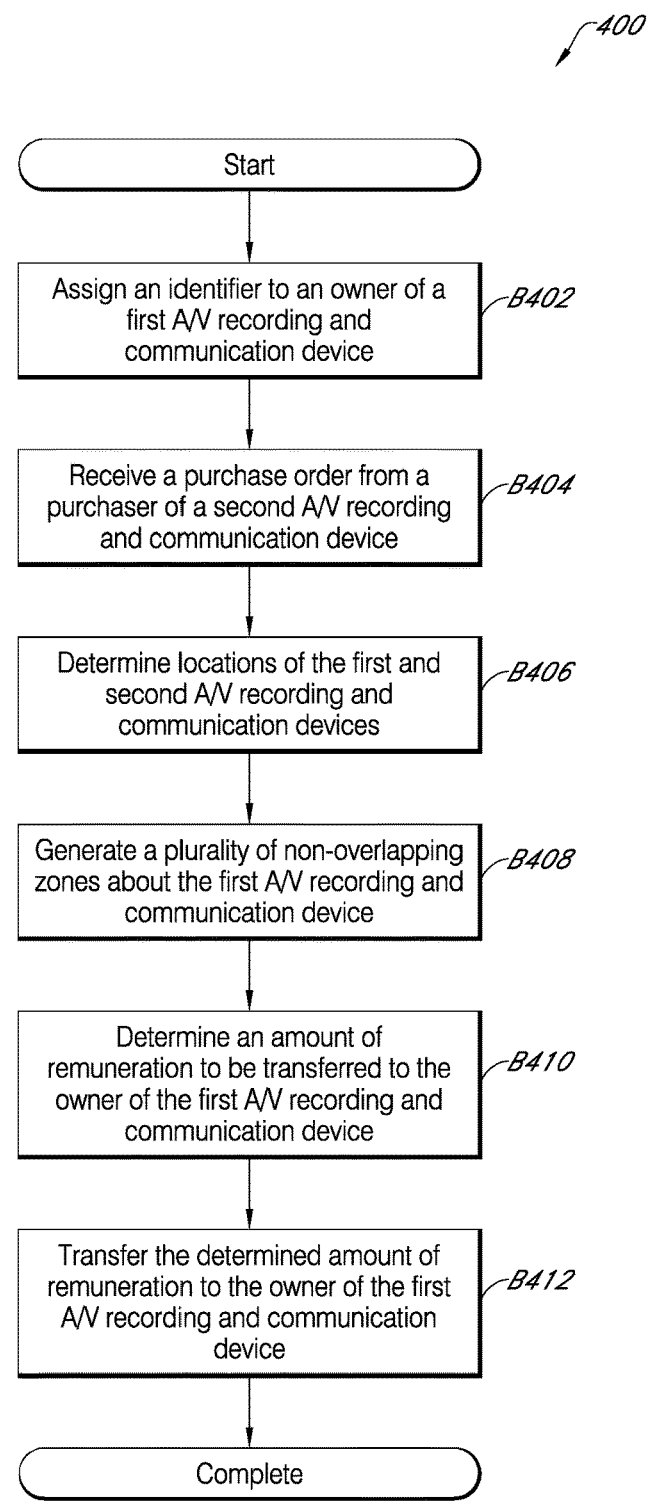
FIG. 18 is a flowchart illustrating one embodiment of a process for transferring a location-weighted remuneration using a plurality of zones according to an aspect of the present disclosure.

FIG. 18 is a flowchart illustrating one embodiment of a process 400 for transferring a location-weighted remuneration 276 using a plurality of zones according to an aspect of the present disclosure. The process 400 may include assigning (block B402) an identifier 270 to an owner of a first A/V recording and communication device 202 comprising a processor 234, a camera 244, and a communication module 246. The identifier 270 may comprise a variety of identifier types such as (but not limited to) a numeric code, an alphanumeric code, and/or a string of random or non-random characters. In other embodiments, the identifier 270 may be any information associated with the owner of the first A/V recording and communication device 202 including (but not limited to) the owner's name, address, email address, phone number, and/or account number. In some embodiments, the owner of the first A/V recording and communication device 202 may be provided with their assigned identifier 270 to provide to potential purchasers of an A/V recording and communication device. The process 400 may further include receiving (block B404) a purchase order 272 for a second A/V recording and communication device 216 comprising a processor 235, a camera 245, and a communication module 247, wherein the purchase order 272 includes the identifier 270 that has been assigned to the owner of the first A/V recording and communication device 202. In various embodiments, the purchase order 272 may be received from a purchaser such as (but not limited to) an end user, retailer, or $3^{rd}$ party reseller. In some embodiments, the purchase order 272 may be submitted electronically via the Internet using a web interface or email, for example. In other embodiments, the purchase order 272 may be submitted as a physical hardcopy purchase order. Along with the identifier 270 assigned to the owner of the first A/V recording and communication device 202, the purchase order 272 may also include a shipping address, a billing address, and/or a street address associated with the second A/V recording and communication device 216 and/or associated with the purchaser of the second A/V recording and communication device 216.

As illustrated in FIG. 18, the process 400 may further include determining (block B406) a location of the first A/V recording and communication device 202 and a location of the second A/V recording and communication device 216. In some embodiments, the location of the first A/V recording and communication device 202 is a known location. For example, the known location of the first A/V recording and communication device 202 may be established when the first A/V recording and communication device 202 is activated. In such embodiments, the known location may comprise a street address, a GPS (Global Positioning System) location, and/or an IP (Internet Protocol)-based location associated with the first A/V recording and communication device 202. In addition, the location of the second A/V recording and communication device 216 may be an expected location such as (but not limited to) a shipping address and/or a billing address associated with the purchase order 272 for the second A/V recording and communication device 216. In alternative embodiments, the location of the second A/V recording and communication device 216 may be a known location, where the known location of the second A/V recording and communication device 216 may be determined after the second A/V recording and communication device 216 is activated. For example, upon activation, the known location of the second A/V recording and communication device 216 may comprise a street address, a GPS location, and/or an IP-based location associated with the second A/V recording and communication device 216. In embodiments where the GPS location is used, the first and/or second A/V recording and communication devices 202, 216 may include a GPS module 250, 251, as described above.

In further reference to FIG. 18, the process 400 may further include generating (block B408) a plurality of non-overlapping zones about the first A/V recording and communication device 202. In such embodiments, with reference to FIG. 19, the plurality of zones may comprise a first zone 454 that is closer to the location 452 of the first A/V recording and communication device 202 than a second zone 456 that is farther away from the location 452 of the first A/V recording and communication device 202 than the first zone 454. In further embodiments, the plurality of zones may also include one or more additional zones, such as a third zone 458, that are even farther away from the location 452 of the first A/V recording and communication device 202 than the first and second zones 454, 456.

Figure 19:
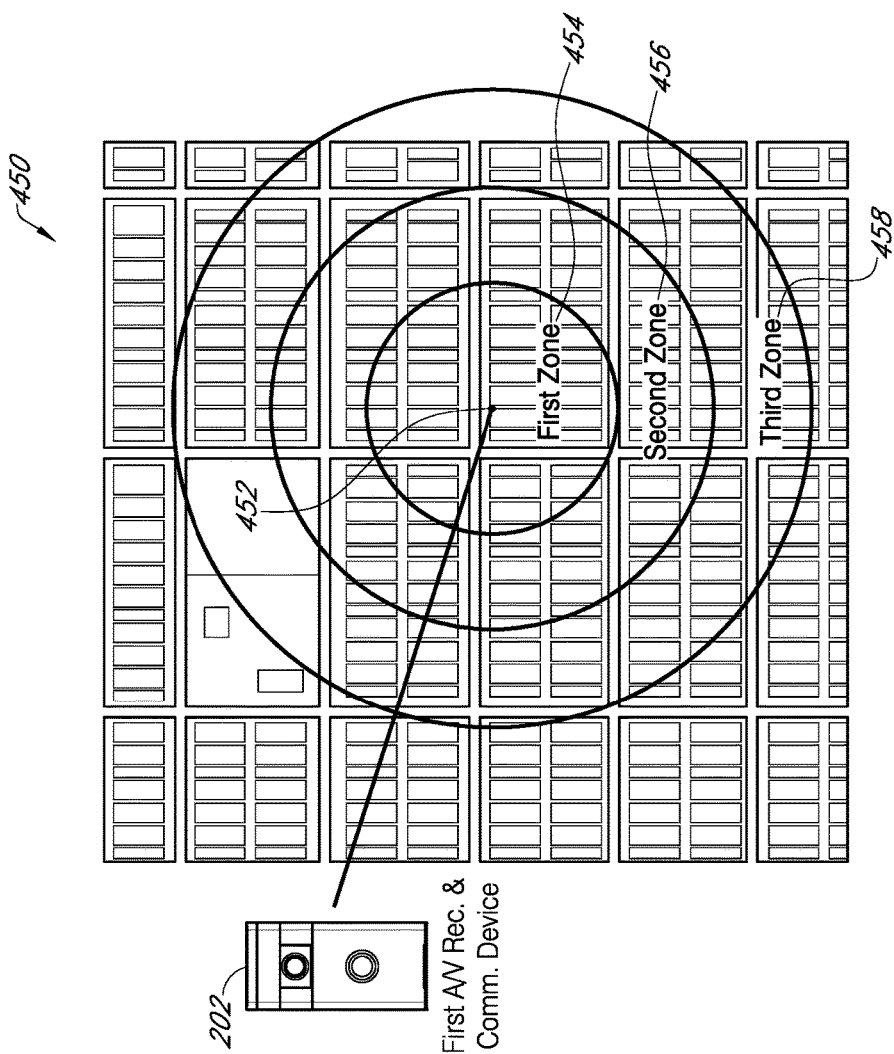
FIG. 19 is a screenshot of a map illustrating a plurality of zones according to an aspect of the present disclosure.

The three zones 454, 456, 458 illustrated in FIG. 19 are merely one example. The present embodiments are not limited to any particular number of zones about the first A/V recording and communication device 202. Further, the zones 454, 456, 458 illustrated in FIG. 19 are concentric circles about the first A/V recording and communication device 202, but the present embodiments are not limited to the zones having any particular shape or arrangement. Still further, in the example illustrated in FIG. 19 the zones 454, 456, 458 each have a radius of approximately one-half block, one block, and one and one-half blocks, respectively, about the first A/V recording and communication device 202. The illustrated sizes of each circle are, however, merely examples and are not limiting. Each zone may have any size/radius as desired for any specific implementation.

In further reference to FIG. 18, the process 400 may include determining (block B410) an amount of remuneration 276 to be transferred to the owner of the first A/V recording and communication device 202. In various embodiments, the amount of the remuneration 276 is greater when the location of the second A/V recording and communication device 216 is within a zone, such as the first zone 454, that is close to the first A/V recording and communication device 202, and the amount of remuneration 276 is lesser when the location of the second A/V recording and communication device 216 is within a zone, such as the second zone 456, that is farther away from the first A/V recording and communication device 202. In further embodiments, the second A/V recording and communication device 216 may be within an additional zone outside the second zone 456, such as (but not limited to) the third zone 458, or a fourth zone (not shown), etc., and the amount or value of the remuneration 276 may progressively decrease as the location of the second A/V recording and communication device 216 is within additional zones that are farther and farther away from the location 452 of the first A/V recording and communication device 202. Thus, for example, the amount or value of the remuneration 276 may be greater when the second A/V recording and communication device 216 is within the second zone 456 as compared to when the second A/V recording and communication device 216 is within the third zone 458, but the amount or value of the remuneration 276 may be greater when the second A/V recording and communication device 216 is within the third zone 458 as compared to when the second A/V recording and communication device 216 is within the fourth zone, etc.

With further reference to FIG. 18, the process 400 may further include transferring (block B412) the determined amount of remuneration 276 to the owner of the first A/V recording and communication device 202. Although specific numbered zones are described above, in additional embodiments, the process may include a single zone, where the amount of remuneration 276 is greater if the location of the second A/V recording and communication device 216 is within the single zone and less if it is outside the single zone.

FIG. 19 is a screenshot of a map illustrating a plurality of zones about the first A/V recording and communication device 202 according to an aspect of the present disclosure. The map 450 illustrates a location 452 of the first A/V recording and communication device 202 along with a plurality of non-overlapping zones 454, 456, 458 about the first A/V recording and communication device 202. As discussed above, the zones 454, 456, 458 may be generated based upon a distance away from the location 452 of the first A/V recording and communication device 202. For example, a first zone 454 may be closer in distance to the location 452 of the first A/V recording and communication device 202 than a second zone 456. Further, the second zone 456 (and the first zone 454) may be closer in distance to the location 452 of the first A/V recording and communication device 202 than a third zone 458. Although the map 450 illustrates zones that are circular, such zones are merely illustrative and may be any shape that is non-overlapping between the zones. In addition, although the map 450 illustrates zones that are generated based on a radial distance away from the location 452 of the first A/V recording and communication device 202, the distance away from the location 452 of the first A/V recording and communication device 202 may be generated based on any measure of distance that may be either symmetric or non-symmetric depending on the aspects of a specific implementation.

As described above, the present embodiments advantageously improve the effectiveness of A/V recording and communication devices by creating incentives for owners of such devices to encourage their neighbors to also purchase and activate such devices. When those neighbors purchase and activate A/V recording and communication devices, the density of the distribution of such devices in neighborhoods increases, thereby making those neighborhoods safer because of the crime deterrent effect of such devices.

Figure 20:
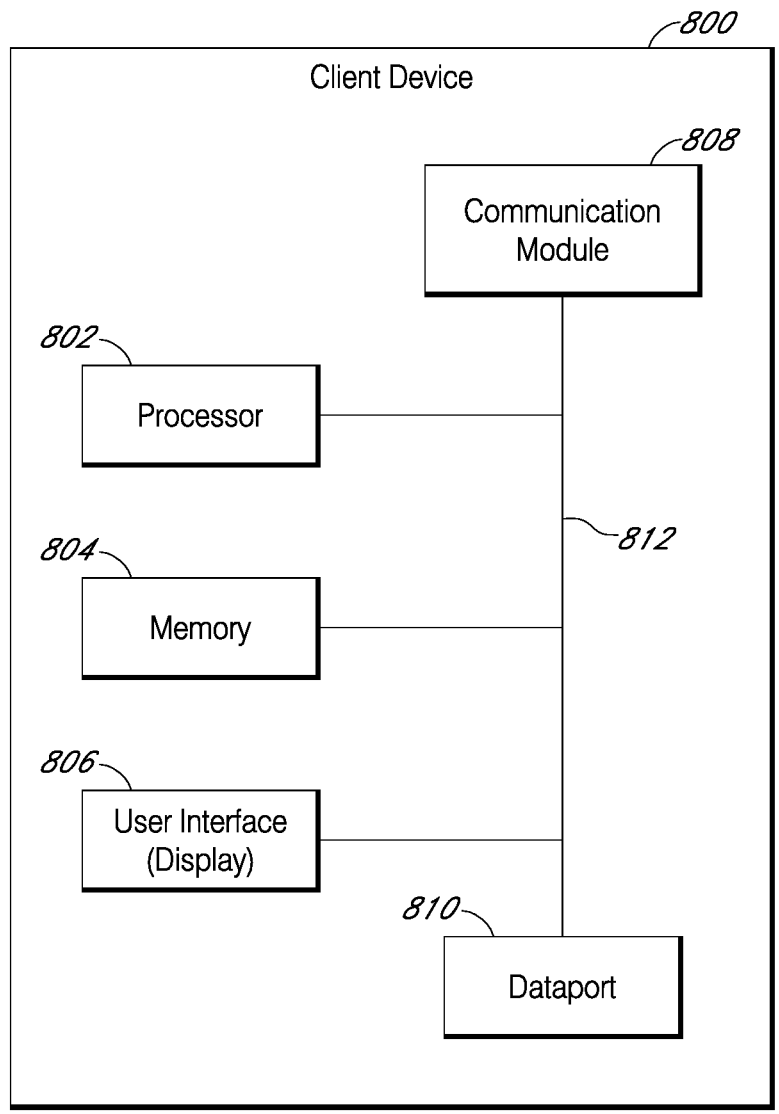
FIG. 20 is a functional block diagram of a client device on which the present embodiments may be implemented according to various aspects of the present disclosure.

FIG. 20 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 20, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 21:
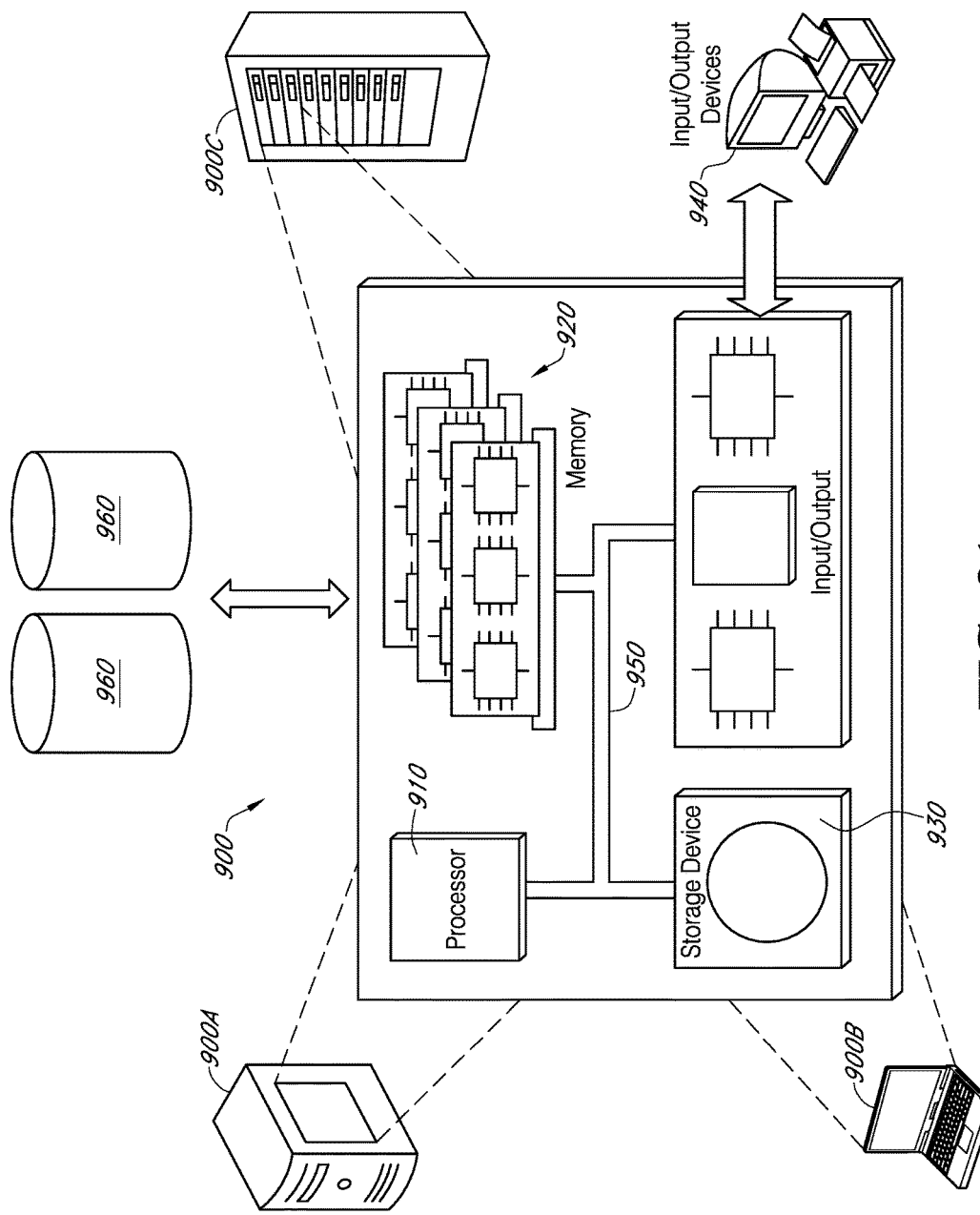
FIG. 21 is a functional block diagram of a general-purpose computing system on which the present embodiments may be implemented according to various aspects of present disclosure.

FIG. 21 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for determining and transferring a location-weighted remuneration by one or more servers in network communication with a first A/V recording and communication device (A/V device), the method comprising:

assigning, by the one or more servers, an identifier to an owner of the first A/V device, wherein:
- the first A/V device comprises a processor, a camera, and a communication module;
- the first A/V device is associated with a first location;
- a second A/V device comprises a processor, a camera, and a communication module; and
- the second A/V device is associated with a second location, wherein the second location of the second A/V device is different from the first location of the first A/V device;

receiving, by the one or more servers, a purchase order for the second A/V device, wherein the purchase order includes the identifier assigned to the owner of the first A/V device;

determining, by the one or more servers, a distance between the first location of the first A/V device and the second location of the second A/V device;

determining, by the one or more servers, an amount of remuneration to be transferred to the owner of the first A/V device, wherein the amount of remuneration is inversely proportional to the determined distance between the first location of the first A/V device and the second location of the second A/V device; and transferring, by the one or more servers, the determined amount of remuneration to the owner of the first A/V device.

2. The method of claim 1, wherein the first location of the first A/V device is a known location.

3. The method of claim 2, wherein the known location of the first A/V device comprises a street address associated with the first A/V device.

4. The method of claim 1, wherein the second location of the second A/V device is an expected location.

5. The method of claim 4, wherein the expected location of the second A/V device comprises a shipping address associated with the purchase order.

6. The method of claim 1, wherein the second location of the second A/V device is a known location.

7. The method of claim 6, wherein the known location of the second A/V device is determined after the second A/V device is activated.

8. The method of claim 7, wherein the known location of the second A/V device comprises a street address associated with the second A/V device.

9. The method of claim 7, wherein the known location of the second A/V device comprises a GPS (Global Positioning System) location of the second A/V device.

10. The method of claim 7, wherein the known location of the second A/V device comprises an IP (Internet Protocol)-based location of the second A/V device.

11. A method for determining and transferring a location-weighted remuneration by one or more servers in network communication with a first A/V recording and communication device (A/V device), the method comprising:

assigning, by the one or more servers, an identifier to an owner of the first A/V device, wherein the first A/V device comprises a processor, a camera, and a communication module;

receiving, by the one or more servers, a purchase order for a second A/V device, wherein the second A/V device comprises a processor, a camera, and a communication module, and wherein the purchase order includes the identifier assigned to the owner of the first A/V device;

determining, by the one or more servers, a first location of the first A/V device and a second location of the second A/V device, wherein the second location of the second A/V device is different from the first location of the first A/V device;

generating, by the one or more servers, a plurality of non-overlapping zones based upon a distance away from the first location of the first A/V device, wherein the plurality of non-overlapping zones comprises a first zone and a second zone, and the first zone is closer than the second zone to the first location of the first A/V device;

determining, by the one or more servers, an amount of remuneration to be transferred to the owner of the first A/V device, wherein the amount of remuneration is greater when the second location of the second A/V device is within the first zone, and the amount of remuneration is lesser when the second location of the second A/V device is within the second zone; and transferring, by the one or more servers, the determined amount of remuneration to the owner of the first A/V device.

12. The method of claim 11, wherein the first location of the first A/V device is a known location.

13. The method of claim 12, wherein the known location of the first A/V device comprises a street address associated with the first A/V device.

14. The method of claim 11, wherein the second location of the second A/V device is an expected location.

15. The method of claim 14, wherein the expected location of the second A/V device comprises a shipping address associated with the purchase order.

16. The method of claim 11, wherein the second location of the second A/V device is a known location.

17. The method of claim 16, wherein the known location of the second A/V device is determined after the second A/V device is activated.

18. The method of claim 17, wherein the known location of the second A/V device comprises a street address associated with the second A/V device.

19. The method of claim 17, wherein the known location of the second A/V device comprises a GPS (Global Positioning System) location of the second A/V device.

20. The method of claim 17, wherein the known location of the second A/V device comprises an IP (Internet Protocol)-based location of the second A/V device.

* * * * *